United States Patent
Fenton et al.

(10) Patent No.: US 12,190,303 B2
(45) Date of Patent: Jan. 7, 2025

(54) POINT-OF-SALE SYSTEM AUTOMATED TESTING

(71) Applicant: Walmart Apollo, LLC, Bentonville, AR (US)

(72) Inventors: Timothy M. Fenton, Bentonville, AR (US); Christopher D. Johnson, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 460 days.

(21) Appl. No.: 15/883,235

(22) Filed: Jan. 30, 2018

(65) Prior Publication Data

US 2018/0247291 A1    Aug. 30, 2018

Related U.S. Application Data

(60) Provisional application No. 62/464,636, filed on Feb. 28, 2017.

(51) Int. Cl.
*G06Q 20/20* (2012.01)
*G06Q 20/40* (2012.01)

(52) U.S. Cl.
CPC .......... *G06Q 20/204* (2013.01); *G06Q 20/20* (2013.01); *G06Q 20/208* (2013.01)

(58) Field of Classification Search
CPC .... G06Q 20/204; G06Q 20/20; G06Q 20/208; G06Q 20/401; G07G 1/0018; G07G 1/12
See application file for complete search history.

(56) References Cited

U.S. PATENT DOCUMENTS

| | | | | |
|---|---|---|---|---|
| 4,587,481 A | * | 5/1986 | Lischke | G01R 31/2853 324/538 |
| 5,138,706 A | * | 8/1992 | Melo | G06F 9/4411 703/27 |
| 5,501,518 A | | 3/1996 | Woodward | |
| 7,464,044 B2 | * | 12/2008 | Conrad | G06F 11/3696 705/7.11 |
| 7,800,383 B2 | | 9/2010 | Liu | |
| 8,117,504 B2 | | 2/2012 | Chang | |
| 2002/0178400 A1 | * | 11/2002 | Venkataraman | G07G 1/00 714/27 |

(Continued)

FOREIGN PATENT DOCUMENTS

| | | | |
|---|---|---|---|
| CN | 100390555 C | * | 5/2008 |
| CN | 101471977 | | 7/2009 |

OTHER PUBLICATIONS

DIY Hacks and How Tos, "Create External Buttons for Your Keyboard", Apr. 22, 2014, Instructable.com, <https://www.instructables.com/Create-External-Buttons-For-Your-Keyboard/> (Year: 2014).*

(Continued)

*Primary Examiner* — Allen C Chein
(74) *Attorney, Agent, or Firm* — Fitch, Even, Tabin & Flannery LLP (57) ABSTRACT

In some embodiments, apparatuses and methods are provided herein useful to test the operation of a point-of-sale (POS) system by executing a testing routine to send signals associated with keystrokes from a POS keyboard to a POS terminal for processing in the POS system. The simulated keystroke signals have expected corresponding operations in the POS system.

15 Claims, 6 Drawing Sheets

(56) References Cited

U.S. PATENT DOCUMENTS

| | | | |
|---|---|---|---|
| 2005/0166105 A1* | 7/2005 | Warren | G01R 31/318536 |
| | | | 714/724 |
| 2009/0210187 A1 | 8/2009 | Lee | |
| 2010/0125445 A1* | 5/2010 | Cheng | G06F 11/261 |
| | | | 703/26 |
| 2010/0268994 A1* | 10/2010 | Chang | G06F 11/2221 |
| | | | 714/44 |
| 2012/0192009 A1 | 7/2012 | Chang | |
| 2015/0261696 A1* | 9/2015 | Christian | G06F 13/105 |
| | | | 703/25 |
| 2017/0146987 A1* | 5/2017 | Ramakrishnan | G06F 30/20 |

OTHER PUBLICATIONS

Pippin, William, "Quick and Easy USB Keyboard Input", Nov. 2013, Nuts and Volts Magazine, pp. 28-29. (Year: 2013).*
Blom, Jim "Turn your ProMicro into a USB Keyboard/Mouse", Jan. 31, 2012, Sparkfun.com (Year: 2012).*
Khaleel; "SMS Based Device Control Using GSM Modem"; http://www.circuitsgallery.com/2014/09/homeappliancescontrol-lingusingmobilephone.html; published Sep. 2014; pp. 1-9.
Verle Milan; "PIC Microcontrollers Programming in C"; Chapter 4: Examples; http://www.mikroe.com/chapters/view/17/; published 2008; pp. 1-40.
Nomaan, Naasif; "RS 232 , Serial Communication With Pic Microcontroller In Proteus"; http://www.pictutorial.net/2015/01/rs232serialcommunicationwith.html; published 2015; pp. 1-20.

* cited by examiner

POINT-OF-SALE SYSTEM AUTOMATED TESTING

CROSS-REFERENCE TO RELATED APPLICATION

This application claims the benefit of U.S. Provisional Application No. 62/464,636, filed Feb. 28, 2017, which is incorporated by reference in its entirety herein.

TECHNICAL FIELD

This invention relates generally to point-of-sale (POS) systems and, more specifically, to the testing of POS systems.

BACKGROUND

It can be important for retail locations to ensure that operating systems for the point-of-sale devices at the location are working correctly. To test the operating system, a retail location might assign a worker to manually enter specific keystrokes into a keyboard of the point-of-sale device and confirm that the expected outcome appears. In such a case, the worker may have to find and load test data, such as credit card information, barcode, and the like, into the system being tested. Thereafter, the worker can then note which defects were discovered during testing for correction. Automating such a process can be difficult. In many cases, the point-of-sale device can utilize custom firmware and connectors. Further, the operating system can be different from retailer to retailer. Due to these factors, it can be difficult to emulate keystrokes in automated testing software.

BRIEF DESCRIPTION OF THE DRAWINGS

Disclosed herein are embodiments of systems, apparatuses and methods pertaining to automated testing of a point-of-sale system. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to test the operation of a point-of-sale (POS) system by executing a testing routine to send signals associated with keystrokes from a POS keyboard to a POS terminal for processing in the POS system. The simulated keystroke signals have expected corresponding operations in the POS system. Any keystrokes that are available to a user operating the POS keyboard during normal use can be simulated during testing.

Figure 1:
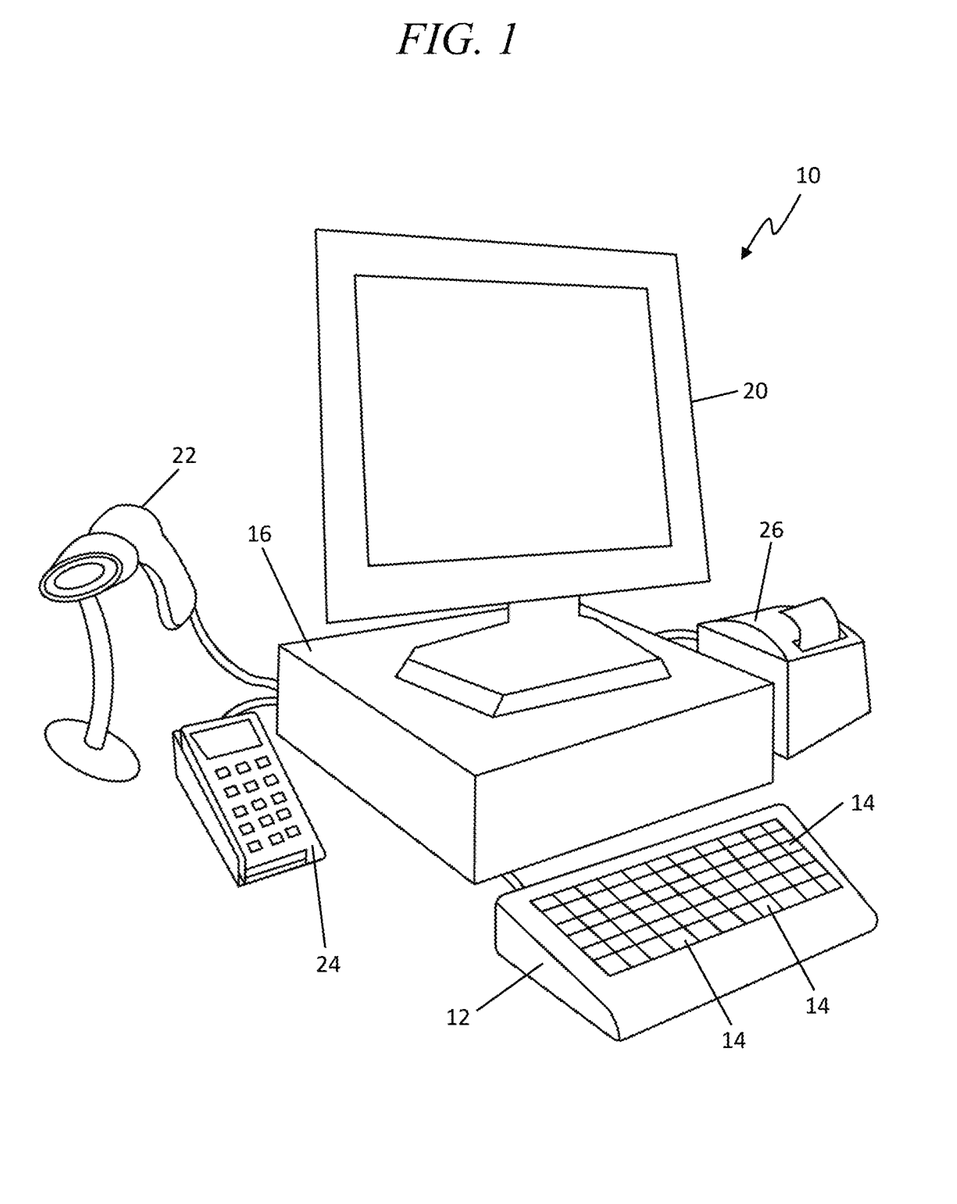
FIG. 1 is a system diagram of a point-of-sale device in accordance with some embodiments.

A POS system 10 is shown in FIG. 1. The POS system 10 includes a POS keyboard 12 having an array of keys 14 thereon. As commonly configured, the individual ones of the keys 14 can have corresponding operations. Additionally, if desired, combinations of multiple keys 14 can have corresponding operations. The POS keyboard 12 couples to a POS terminal 16 or other control circuit to receive signals from the POS keyboard 12 based on actuation of selected keys 14. More specifically, the POS keyboard 12 includes a keyboard circuit board 18 that is disposed between the keys 14 and the POS terminal 16, such that the keyboard circuit board 18 receives signals as the keys 14 are actuated and sends the signals to the POS terminal 16. The POS terminal 16 performs operations corresponding to the keystrokes entered into the POS keyboard 12 and causes outputs regarding the operations to display on a monitor 20. For each keystroke, there is an expected output to be displayed on the monitor 20. The POS system 10 can further include a scanner device 22, such as a handheld and/or fixed scanner device configured to scan UPC or other barcodes for products, a payment interface 24 for credit and debit cards, configured as commonly understood to receive payment authorization for a transaction, such as by swiping, dipping, inserting, and so forth, and a printer device 26.

So configured, as set forth, users typically test the operation of the POS system 10 by manually pressing keys 14 and checking that the monitor 20 displays an expected output. Testing can utilize any keystroke available on the POS keyboard 12, such as logging on as an authorized user, inputting an identification number for a particular item by the keys 14 or scanner device 22, updating a product quantity for a transaction, checking out with cash, check, and/or credit or debit with the payment interface 24, printing a gift receipt, and so forth.

A testing system 30 according to various embodiments described herein is shown in FIGS. 2-6. The testing system 10 is configured to couple to the POS terminal 16 to perform automated testing of the POS system 10. More specifically, the system 10 operates a program that simulates a series of keystrokes on the POS keyboard 12. Pursuant to this, the testing system 30 includes a testing circuit board 32, a first control circuit or controller 34, and a second control circuit 36. As discussed above, POS systems 10, and the components therefor, can utilize custom firmware and connectors, making automated testing difficult. Accordingly, the testing system 20 can further include the keyboard circuit board 18, which can be removed from the POS keyboard 12, to enable easy connection to the POS terminal 16.

The term control circuit refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuits 34, 36 may be configured (for example, by using corresponding programming stored in a memory as will be well understood by those skilled in the art) to carry out one or more of the steps, actions, and/or functions described herein.

Figure 2:
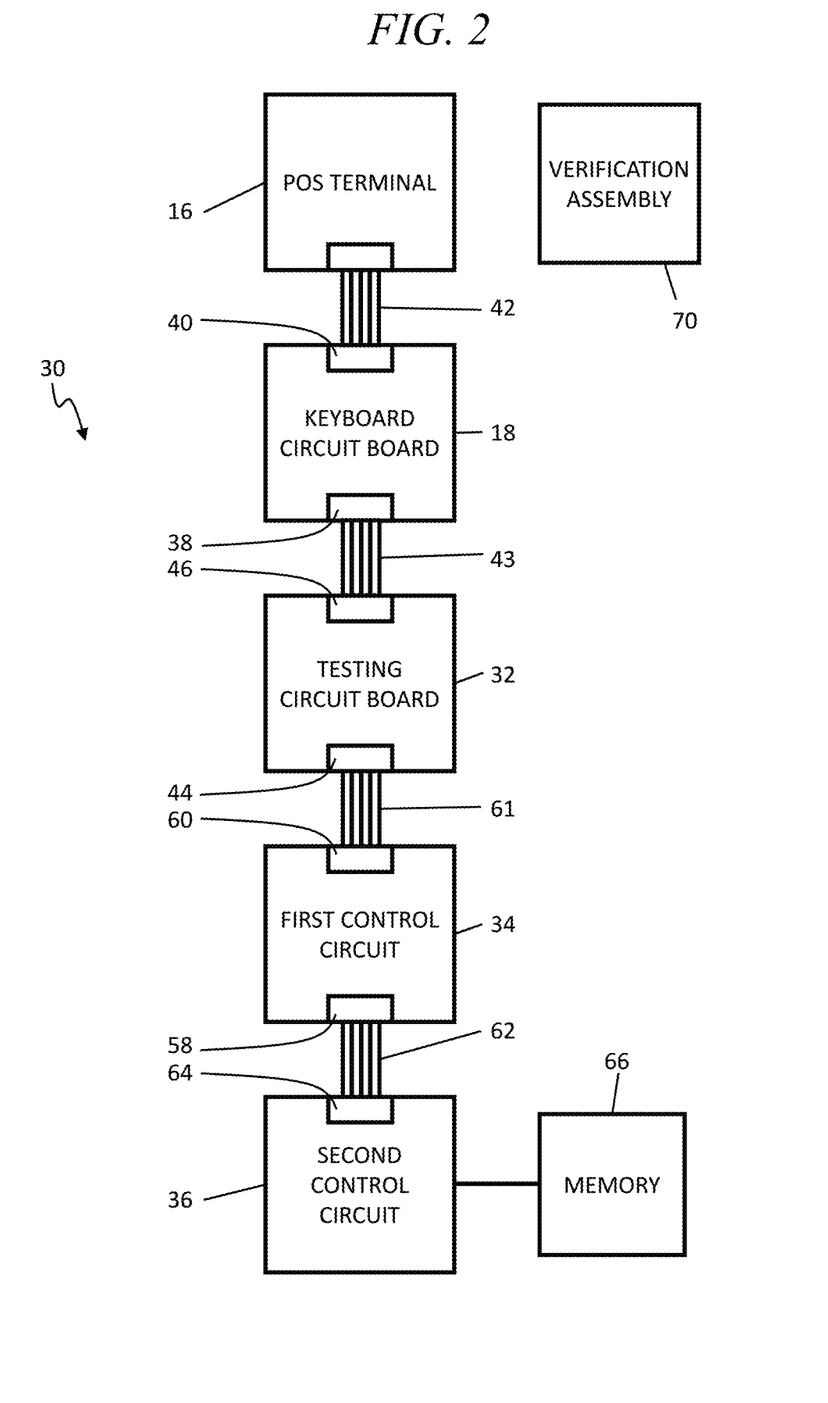
FIG. 2 is a system diagram of a testing system for a point-of-sale device in accordance with several embodiments.

As shown in FIG. 2, the keyboard circuit board 18 includes inputs 38 and outputs 40 for connecting to other components of the testing system 30. The inputs and outputs described herein can refer to electrical pathways in any suitable configuration, such as pins, ports, traces, and so forth. The outputs 40 are configured to connect to a cable or other connector 42 that couples the keyboard circuit board 18 to the POS terminal 16. As set forth above, the cable 42 can be custom for a particular operating system or configuration. Of course, if suitable, other wired or wireless connections could also be utilized. As set forth above, the inputs 38 are typically coupled to the keys 14 and configured to receive signals therefrom when actuated. After removal from the POS keyboard 12, however, the inputs 38 are utilized to connect the keyboard circuit board 18 to the testing circuit board 32 using wires 43 or other suitable electrical connections.

Figure 3:
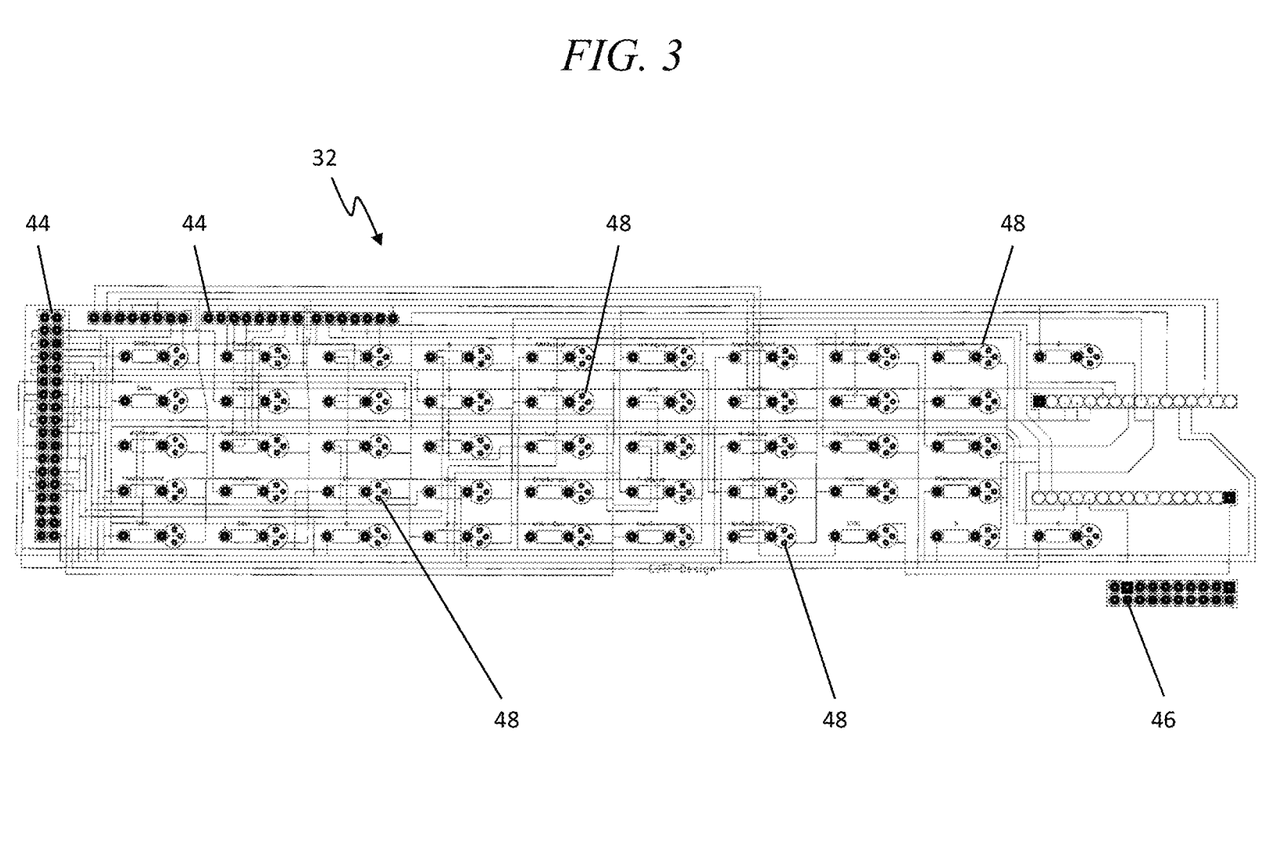
FIG. 3 is a diagram of a circuit board in accordance with some embodiments.

An example testing circuit board 32 is shown in more detail in FIG. 3. The testing circuit board 32 includes inputs 44 and outputs 46 for connecting to other components of the testing system 30. The testing circuit board 32 further includes an array of electrical switches 48 configured to create signals corresponding to keystrokes on the POS keyboard 12. More specifically, in the illustrated embodiment, the electrical switches 48 are transistors. Hi or low voltage is sent to each transistor 48 in the array so that the pathway therethrough is open or closed and a corresponding signal is generated for output. So configured, the transistors 48 are biased to output electrical signals that simulate the signals produced by user keystrokes on the POS keyboard 12.

Figure 4:
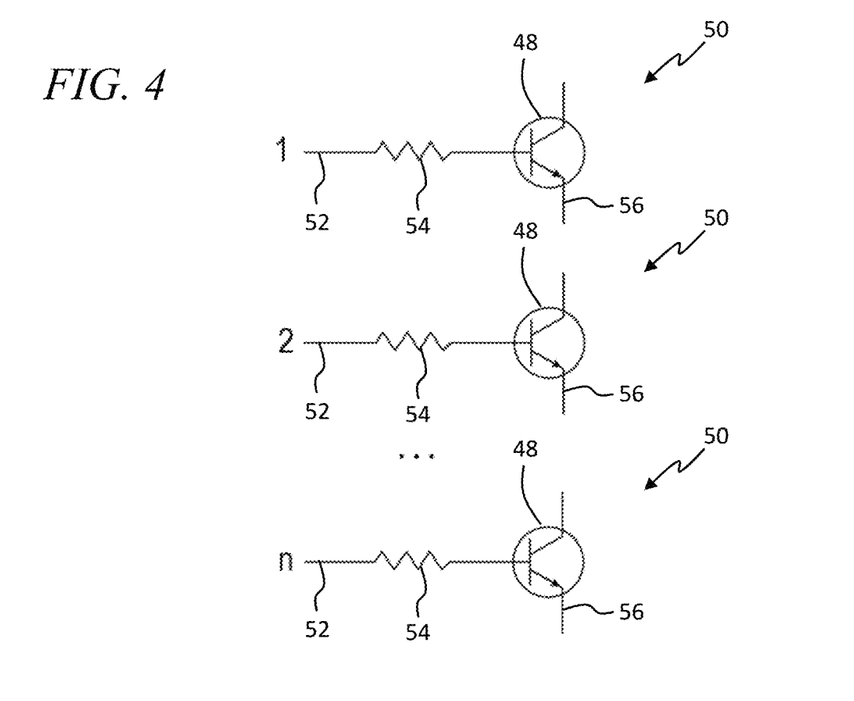
FIG. 4 is a diagram of an electrical switch coupled to the circuit board of FIG. 3 in accordance with several embodiments.

By one approach, the number of transistors 48 and keys 14 has a 1:1 ratio. By other approaches, the number of transistors 48 can be less than the number of keys 14 and configured so that individual keys 14 on the POS keyboard 12 are represented by biasing more than one transistor 48. Of course, the testing circuit board 32 can also have more transistors 48 than keys 14, such that the board 32 can be used for various applications or updated if additional keys 14 are added. One example circuit setup for the transistors 48 is shown in FIG. 4. A pathway 50 for each transistor 48 includes an input 52, a resistor 54 to ensure that the transistor 48 is biased correctly, the transistor 48, and an output 56. This circuit setup can be repeated as necessary for the desired number of electrical switches 48.

The number of outputs 46 of the testing circuit board 32 correspond to the number of inputs 38 of the keyboard circuit board 18. In some embodiments, the number of outputs 46 is less than the number of transistors 48. In such embodiments, at least some signals from the transistors 48 can be electrically or mechanically multiplexed so that the signals are correctly sent through the keyboard circuit board 18 to the POS terminal 16.

In some embodiments, the first control circuit 34 is a controller that can be mounted to or embedded within the testing circuit board 32. In other embodiments, the first control circuit 34 can be separate from the testing circuit board 32 and electrically coupled thereto. The controller 34 is configured to send signals to the array of electrical switches 48 to thereby control which key 14 is simulated. The controller 34 includes inputs 58 and outputs 60 for connecting to the other components of the testing system 30. If desired, the number of outputs 60 on the controller 34 can correspond to or be larger than the number of electrical switches 48 so that the control 34 can selectively send signals along individual wires 61 or other electrical paths to activate individual electrical switches 48. In the illustrated form, the input 58 includes a USB port such that a cord 62 or other electrical connection can provide an easy connection to the second control circuit 36. Of course, any suitable connection can be utilized.

The second control circuit 36 is utilized to execute a testing program thereon and send corresponding instructions to the first control circuit 34. In the illustrated form, the second control circuit 36 is a computing device, such as a laptop or the like. The second control circuit 36 includes an output 64 to couple to the first control circuit 34. As with the above embodiment, the output 64 can be a USB port or similar connection to couple the first and second control circuits 34, 36. By some approaches, the second control circuit 36 includes a memory 66 having the testing program stored therein, such that execution of the testing program on the second control circuit 36 causes the first control circuit 34 to selectively send signals to the array of electrical switches 48 in accordance with a testing routine to thereby simulate the desired keystrokes input into the testing program. By other approaches, the testing program can be stored remotely and accessed by the second control circuit 36.

So configured, a user connects the components of the testing system together and to a POS terminal 16, as described above. The user then accesses and selects a desired testing program using the second control circuit 36. Upon execution, the testing program causes the second control circuit 36 to send signals to the controller 34 that cause the controller 34 to send signals to individual ones or combination of ones of the electrical switches 48. The selected electrical switches 48 then bias according to the signals, which causes the testing circuit board 32 to output signals to the keyboard circuit board 18 that simulate signals from desired keystrokes at the POS keyboard 12. The keyboard circuit board 18 then transfers the signals to the POS terminal 16 for execution of the operation corresponding to the simulated keystroke. The testing program can test as many POS functions in a single routine as desired. If preferred, the testing program can break out sets of POS functions to be simulated upon selection by a user.

Figure 5:
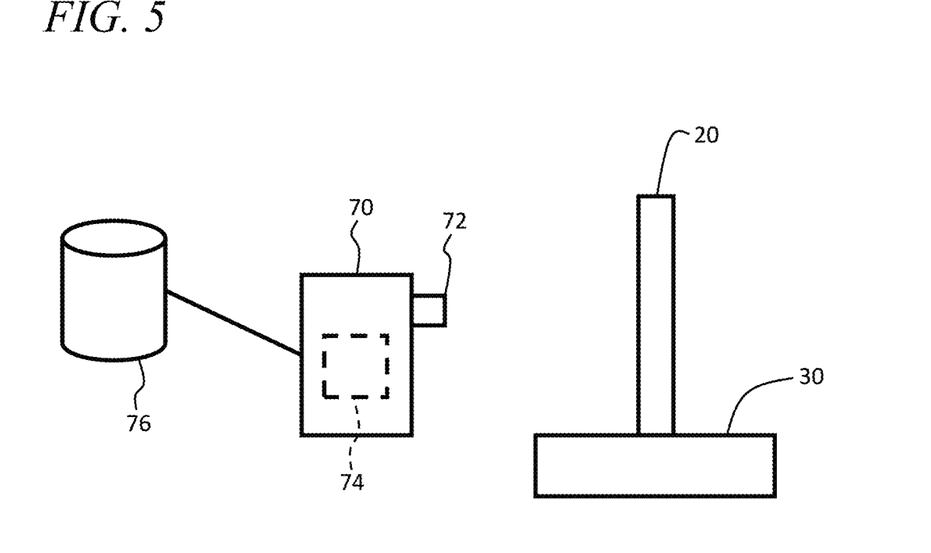
FIG. 5 is a verification assembly for a point-of-sale testing system in accordance with some embodiments.

In some forms, the testing system 30 can further include a verification assembly 70 to verify that the output on the monitor 20 after each simulate keystroke matches an expected display. Pursuant to this, the verification assembly 70 includes an electronic imager 72, such as a camera, oriented to capture video or images of the display on the monitor 20. The verification assembly 70 further includes a control circuit 74 configured to analyze the video or images, using any suitable software, to confirm that the operating system operates correctly during the testing routine. More specifically, the control circuit 74 can compare the video or images with expected displays stored in a server 76 or other storage device. The control circuit 74 can be one of the first or second control circuits 24, 26 or separate therefrom, as desired.

By another approach, the terminal 16 can be configured to generate images of the operations output during the testing routine, such as by screen capture or the like, and the images can be analyzed by the control circuit 74 to determine whether the correct operation was executed.

Figure 6:
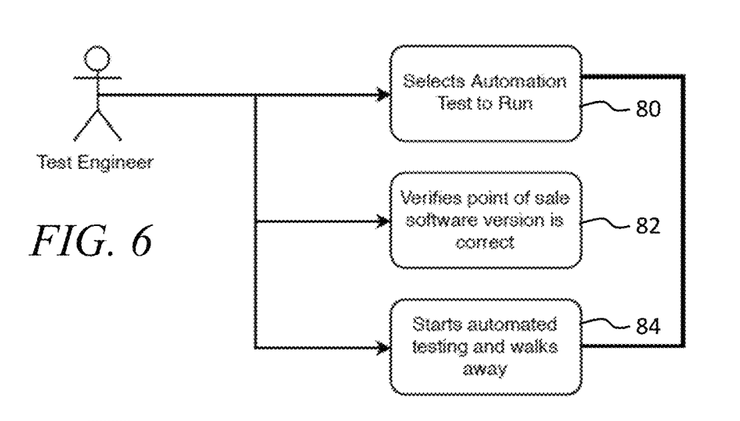
FIG. 6 is a flowchart in accordance with several embodiments.
Figure 7:
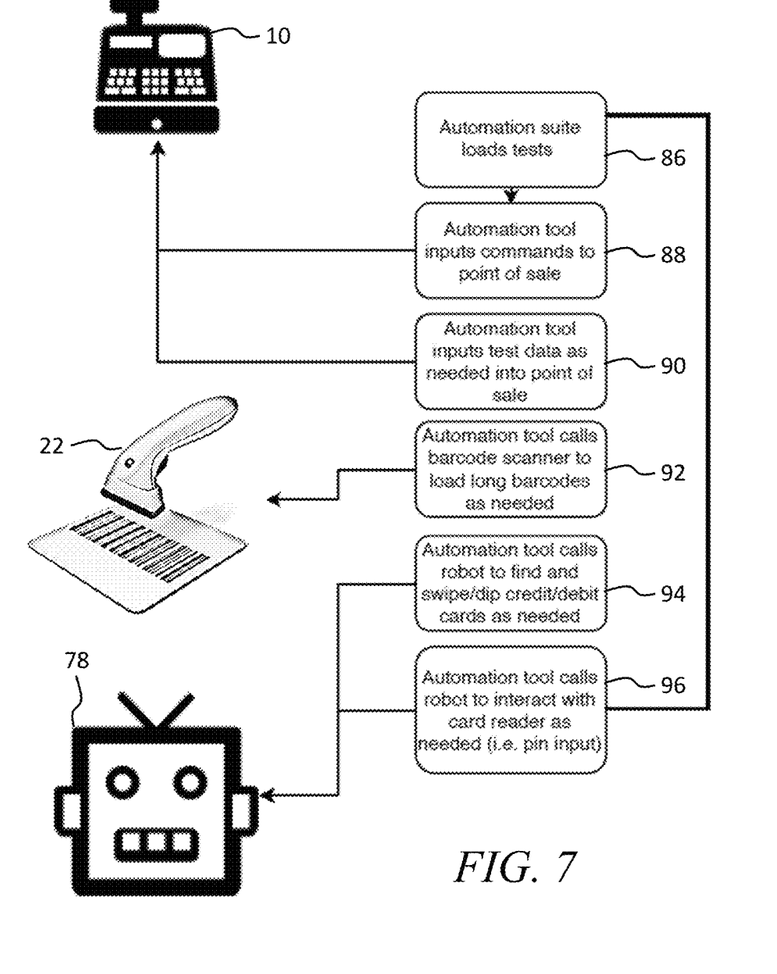
FIG. 7 is a flowchart in accordance with some embodiments.

With this configuration, as shown in FIG. 6, an associate need only select 80 a desired testing program to run on the second control circuit 36, verify 82 that the operating system is utilizing the correct version of the operating software, and start 84 the automated testing. From the hardware and software perspective, as shown in FIG. 7, an automation suite loads 86 the testing routine in response to the associate instruction. Thereafter, the automation tool inputs 88 commands to the POS terminal 16 and inputs 90 test data as needed into the POS terminal 16. Inputting 88 test data into the POS terminal 18 can include calling 92 the scanner device 22 to load barcodes as needed, calling 94 a robot or other automated device 78 to enter credit/debit card information at the payment interface 24, and calling 96 a robot or other automated device 78 to enter further information into the payment interface 24, such as a personal identification number (PIN), signature, or the like. So configured, the automated testing system 30 is capable of completing around 400 testing routines in a day, while it would take around 10 human workers to do the same number of tests in a work day.

In some embodiments, a point-of-sale (POS) testing system for testing a POS computing device is described herein that includes a keyboard circuit board for a POS keyboard coupled to the POS computing device. The keyboard circuit board is configured to receive signals upon actuation of one or more of a plurality of keys of the POS keyboard and send the signals to the POS computing device to cause the POS computing device to perform corresponding operations. The system further includes a testing circuit board removably connected to the keyboard circuit board and having an array of electrical switches mounted thereto; a first control circuit coupled to the array of electrical switches and configured to control operation thereof; and a second control circuit coupled to the first control circuit and configured to execute a testing program. Execution of the testing program is configured to cause the first control circuit to selectively activate one or more of the electrical switches in accordance with a testing routine to output electrical signals to the keyboard circuit board which simulates actuation of individual ones of the plurality of keys without actual actuation of the plurality of keys such that the keyboard circuit board outputs signaling to the POS computing device to perform the corresponding operations.

By several approaches, the testing circuit board can further include input and output pins. By further approaches, a number of the input pins and a number of the output pins can be different. By yet further approaches, the output pins can utilize mechanical multiplexing. By other approaches, the keyboard circuit board can have a proprietary input and the output pins of the testing circuit board can be configured to couple to the proprietary input.

By some approaches, the system can further include a verification device configured to monitor the operation of the POS computing device to confirm that the simulated actuation of the individual ones of the plurality of keys caused the POS computing device to perform the corresponding operations. By further approaches, the system can further include a monitor coupled to the POS computing device, and the verification device can be configured to compare a display on the monitor after each of the corresponding operations to expected displays.

By several approaches, the testing program can execute a plurality of routines, each of the plurality of routines configured to output a series of signals to the second control circuit, the series of signals corresponding to multiple key manipulations of the plurality of keys of the POS keyboard and/or user actions of the POS computing device such that the POS computing device performs a given function.

Figure 8:
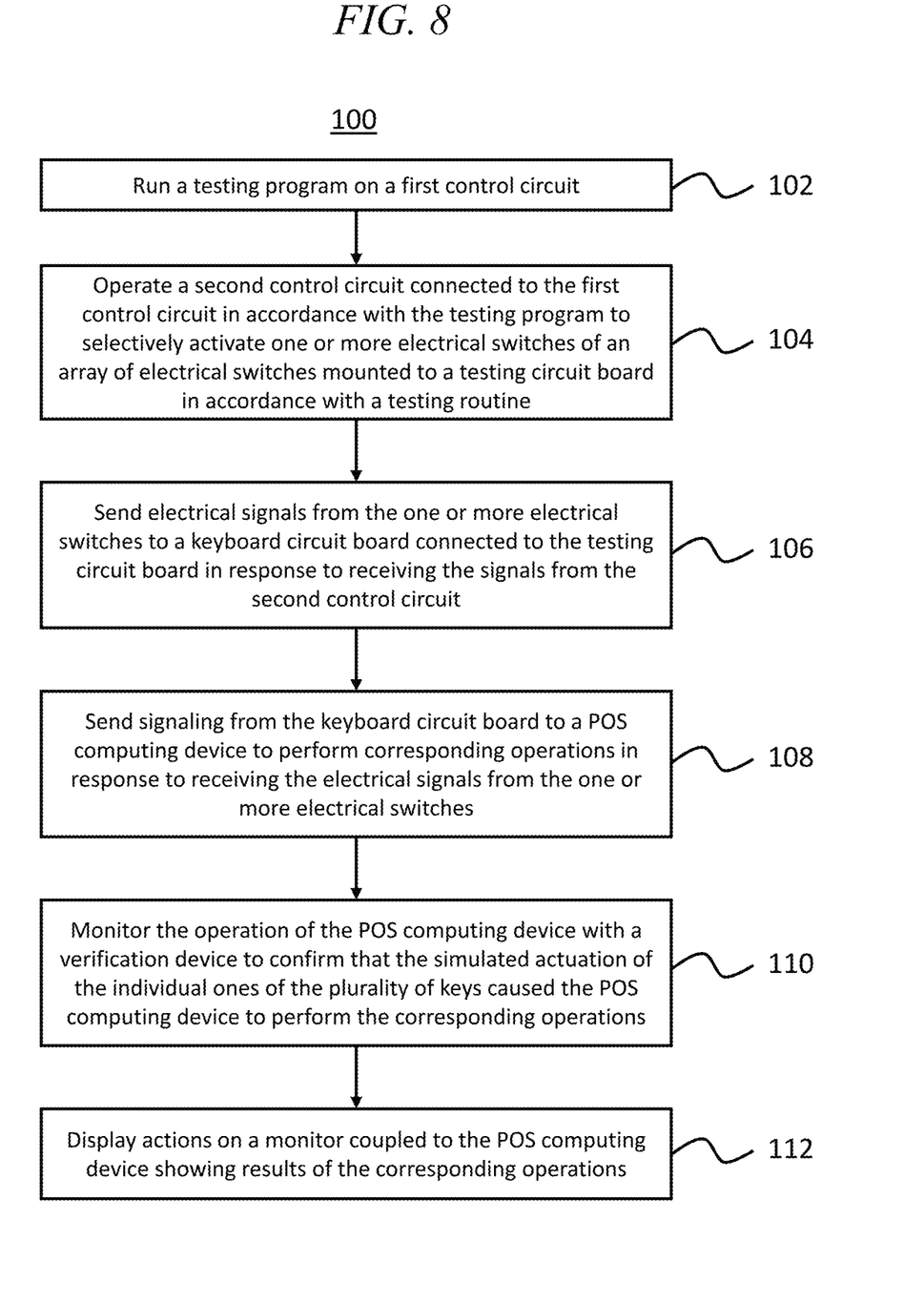
FIG. 8 is a flowchart in accordance with several embodiments.

In several embodiments, a method 100 for testing a point-of-sale (POS) system including a POS computing device and a POS keyboard coupled to the POS computing device is described herein. The POS keyboard has a plurality of keys and a keyboard circuit board that is configured to receive signals upon actuation of one or more of the plurality of keys and send the signals to the POS computing device to cause the POS computing device to perform corresponding operations. The method 100 includes: running 102 a testing program on a first control circuit; operating 104 a second control circuit connected to the first control circuit in accordance with the testing program to selectively activate one or more electrical switches of an array of electrical switches mounted to a testing circuit board in accordance with a testing routine; sending 106 electrical signals from the one or more electrical switches to the keyboard circuit board connected to the testing circuit board in response to receiving the signals from the second control circuit, the electrical signals configured to simulate actuation of individual ones of the plurality of keys without actual actuation thereof; and sending 108 signaling from the keyboard circuit board to the POS computing device to perform the corresponding operations in response to receiving the electrical signals from the one or more electrical switches.

By some approaches, operating 104 the second control circuit to selectively activate the one or more electrical switches can include operating the second control circuit to activate individual electrical switches of the array of electrical switches, each individual electrical switch corresponding to one of the plurality of keys. By further approaches, operating the second control circuit to selectively activate the one or more electrical switches can include sending signals through individual ones of a plurality of output pins mounted to the second control circuit, each of the plurality of output pins having a corresponding one of the one or more electrical switches.

By several approaches, the method 100 can further include monitoring 110 the operation of the POS computing device with a verification device to confirm that the simulated actuation of the individual ones of the plurality of keys caused the POS computing device to perform the corresponding operations.

By some approaches, the method 100 can further include displaying 112 actions on a monitor coupled to the POS computing device showing results of the corresponding operations; and wherein monitoring 110 the operation of the POS computing device comprises comparing the actions on the monitor to expected actions.

By several approaches, running 102 the testing program can include executing a plurality of routines, each of the plurality of routines configured to output a series of signals to the second control circuit, the series of signals corresponding to multiple key manipulations of the plurality of keys of the POS keyboard and/or user actions of the POS computing device such that the POS computing device performs a given function.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept. For example, although the POS system 10 is described herein with reference to a retail store, the testing system described herein can be utilized to test any operating system having a keyboard input.

What is claimed is:

1. A point-of-sale (POS) testing system for testing a POS computing device, the system comprising:
   a keyboard circuit board for a POS keyboard coupled to the POS computing device, the keyboard circuit board configured to receive signals upon actuation of one or more of a plurality of keys of the POS keyboard and send the signals to the POS computing device to cause the POS computing device to perform corresponding operations;
   a testing circuit board removably connected to the keyboard circuit board and having input pins, output pins, and an array of electrical switches mounted thereto, the number of input pins exceeding the number of output pins, the testing circuit board being customized such that predetermined arrangements of electrical switches correspond to predetermined keys of the POS keyboard, the electrical switches comprising transistors;
   a first control circuit coupled to the array of electrical switches and configured to control operation thereof, the first control circuit comprising a microcontroller configured to trigger the predetermined arrangements of electrical switches;
   a second control circuit coupled to the first control circuit and configured to execute a testing program, wherein execution of the testing program is configured to cause the first control circuit to selectively activate one or more of the electrical switches in accordance with a testing routine to output electrical signals to the keyboard circuit board which simulates actuation of individual ones of the plurality of keys without actual actuation of the plurality of keys such that the keyboard circuit board outputs signaling to the POS computing device to perform the corresponding operations;
   wherein the number of electrical switches exceeds the number of output pins and an arrangement of at least one electrical switch corresponds to each output pin in a predetermined manner;
   wherein the testing system utilizes multiplexing to send at least some signals from the electrical switches through the corresponding output pins to the keyboard circuit board.

2. The system of claim 1, wherein a number of the plurality of electrical switches and a number of the plurality of keys have a 1:1 ratio.

3. The system of claim 1, wherein the first control circuit is mounted to the testing circuit board.

4. The system of claim 1, wherein the keyboard circuit board comprises a proprietary input and the output pins of the testing circuit board are configured to couple to the proprietary input.

5. The system of claim 1, further comprising a verification assembly configured to monitor the operation of the POS computing device to confirm that the simulated actuation of the individual ones of the plurality of keys caused the POS computing device to perform the corresponding operations.

6. The system of claim 5, wherein the verification assembly comprises:
   a monitor coupled to the POS computing device;
   an electronic imager oriented to capture video or images of a display on the monitor; and
   a third control circuit configured to compare the video or images of the display on the monitor with video or images of expected displays stored in a storage device;
   wherein the third control circuit is configured to compare the display on the monitor after each of the corresponding operations to the expected displays.

7. The system of claim 1, wherein the testing program executes a plurality of routines, each of the plurality of routines configured to output a series of signals to the second control circuit, the series of signals corresponding to multiple key manipulations of the plurality of keys of the POS keyboard and/or user actions of the POS computing device such that the POS computing device performs a given function.

8. A method for testing a point-of-sale (POS) system including a POS computing device and a POS keyboard coupled to the POS computing device, the POS keyboard having a plurality of keys and a keyboard circuit board configured to receive signals upon actuation of one or more of the plurality of keys and send the signals to the POS computing device to cause the POS computing device to perform corresponding operations, the method comprising:
   running a testing program on a first control circuit;
   operating a second control circuit connected to the first control circuit in accordance with the testing program to selectively activate one or more electrical switches of an array of electrical switches mounted to a testing circuit board in accordance with a testing routine, the testing circuit board having input pins and output pins, the number of input pins exceeding the number of output pins, the testing circuit board being customized such that predetermined arrangements of electrical switches correspond to predetermined keys of the POS keyboard, the electrical switches comprising transistors;
   the second control circuit comprising a microcontroller configured to trigger the predetermined arrangements of electrical switches;
   sending electrical signals from the one or more electrical switches to the keyboard circuit board connected to the testing circuit board in response to receiving the signals from the second control circuit, the electrical signals configured to simulate actuation of individual ones of the plurality of keys without actual actuation thereof;
   sending signaling from the keyboard circuit board to the POS computing device to perform the corresponding operations in response to receiving the electrical signals from the one or more electrical switches;
   the number of electrical switches exceeding the number of output pins and an arrangement of at least one electrical switch corresponding to each output pin in a predetermined manner;
   utilizing multiplexing to send at least some signals from the electrical switches through the corresponding output pins to the keyboard circuit board to the POS computing device.

9. The method of claim 8, wherein operating the second control circuit to selectively activate the one or more electrical switches comprises operating the second control circuit to activate individual electrical switches of the array of electrical switches, each individual electrical switch corresponding to one of the plurality of keys.

10. The method of claim 8, wherein activating the one or more electrical switches comprises sending signals through input pins mounted to the testing circuit board; and wherein sending electrical signals from the one or more electrical switches to the keyboard circuit board comprises sending the electrical signals through the output pins mounted to the testing circuit board.

11. The method of claim 8, further comprising monitoring the operation of the POS computing device with a verification assembly to confirm that the simulated actuation of the individual ones of the plurality of keys caused the POS computing device to perform the corresponding operations.

12. The method of claim 11, further comprising:
coupling a monitor to the POS computing device;
orienting an electronic imager to capture video or images of a display on the monitor; and
by a third control circuit, comparing the video or images of the display on the monitor with video or images of expected displays stored in a storage device;
wherein the third control circuit is configured to compare the display on the monitor after each of the corresponding operations to the expected displays.

13. The method of claim 8, wherein running the testing program comprises executing a plurality of routines, each of the plurality of routines configured to output a series of signals to the second control circuit, the series of signals corresponding to multiple key manipulations of the plurality of keys of the POS keyboard and/or user actions of the POS computing device such that the POS computing device performs a given function.

14. The system of claim 5, wherein the verification assembly comprises:
a screen capture of images or video output during the testing routine; and
a third control circuit configured to compare the video or images output during the testing routine with video or images of expected output stored in a storage device;
wherein the third control circuit is configured to compare the video or images output during the testing routine after each of the corresponding operations to the video or images of expected output.

15. The system of claim 1, further comprising:
a payment interface coupled to the POS computing device; and
a robot configured to enter credit or debit card information, a personal identification number, or a signature at the payment interface.

\* \* \* \* \*